United States Patent
Ito et al.

(10) Patent No.: US 6,233,520 B1
(45) Date of Patent: May 15, 2001

(54) MAP DATA ACCESS METHOD FOR NAVIGATION AND NAVIGATION SYSTEM

(75) Inventors: Toru Ito, Nagoya; Akimasa Nanba, Okazaki; Hidetoshi Fujimoto, Toyokawa; Hiroshi Takeuchi, Nishinomiya; Fumihiko Matsumura, Nagoya; Nobuyuki Nakano, Katano, all of (JP)

(73) Assignees: Toyota Jidosha Kabushiki Kaisha, Toyota; Aisin AW Co., Ltd., Anjo; Denso Corporation, Kariya; Fujitsu Ten Limited, Kobe; Matsushita Electric Industrial, Kadoma, all of (JP)

( * ) Notice: Subject to any disclaimer, the term of this patent is extended or adjusted under 35 U.S.C. 154(b) by 0 days.

(21) Appl. No.: 09/249,163

(22) Filed: Feb. 12, 1999

(30) Foreign Application Priority Data

Feb. 13, 1998 (JP) .................................. 10-031646

(51) Int. Cl.$^7$ ...................................... G06F 17/30
(52) U.S. Cl. ................ 701/208; 701/209; 707/1
(58) Field of Search ............................ 701/200, 207–216; 707/1, 2

(56) References Cited

U.S. PATENT DOCUMENTS 5,968,109  10/1999  Israni et al. .
6,038,559   3/2000  Ashby et al. .
6,047,280 * 4/2000  Ashby et al. ............................ 707/2
6,081,665   6/2000  Nilsen et al. .
6,083,353   7/2000  Alexander, Jr. .
6,094,677   7/2000  Capek et al. .

FOREIGN PATENT DOCUMENTS

0828224  * 3/1998 (EP) ............................. G06F/17/60
2-129800    5/1990 (JP) .

* cited by examiner

Primary Examiner—Bernarr E. Gregory
(74) Attorney, Agent, or Firm—Finnegan, Henderson, Farabow, Garrett & Dunner, L.L.P.

(57) ABSTRACT

There is provided a map data access method and device capable of reading out from a recording medium the map data requested by a navigation system and providing them to the system whether C language, etc. or JAVA (trademark), etc. is employed to constitute a processing program on the navigation system side. In the recording medium, the map data and a reading method of the data are recorded in pairs in a map data section and a method section, respectively. When a navigation function section requests the map data, a data access section reads out desired data in a method (program) read out from the method section according to a requested application programming interface (API). The data read out are supplied as a byte array object to the navigation function section.

14 Claims, 1 Drawing Sheet

MAP DATA ACCESS METHOD FOR NAVIGATION AND NAVIGATION SYSTEM

BACKGROUND OF THE INVENTION

1. Field of the Invention

The present invention relates to a method and system for reading out map data from a recording medium in which the map data are recorded, and supplying them to a navigation system.

2. Description of the Related Art

Heretofore, there has been a known navigation system which reads out map data recorded in a recording medium, such as a CD-ROM or a DVD, and displays the map data and the present location of a vehicle and also guides the vehicle by displaying an optimum route to a destination on the map data (Japanese Patent Laid-Open Publication No. Hei 2-129800).

It is considered that a recording medium to be used for such a navigation system should have sufficient compatibility so as not to rely on a hardware structure of the navigation system or an operating system (OS). In other words, it is desirable that different manufactures can provide recording media from area to area or various manufacturers having different sources of map data (for example, a data source of restaurants or a data source of hotels) can provide recording media.

As a method of securing compatibility of such a recording medium, there is a method of fixing a single recording format of the map data of the recording medium and previously letting a map data readout access program on the navigation system side have a very small procedure to read out desired map data.

However, such a method will not be realistic if the recent remarkable increase of navigation functions is taken into consideration, even if the map data necessary for the functions of the navigation system do not change for a long period of time (for example, ten years). More specifically, if the recording format is fixed, it will be impossible to cope with a future increase of the navigation functions. Thus, the navigation functions will be limited so as to maintain compatibility. Further, if a wide range of revision is required, it will be necessary to reconstruct the recording format.

Thus, in order to solve the problems mentioned above, a way (object oriented) to let the readout access program on the navigation side have an application programming interface (API) for reading out desired map data and let the recording medium have a method to read out the map data according to a message from the API together with the map data which are the pair to the method is proposed. In this way, when necessary navigation functions are added or revised, definition of the API is added or the API is revised. For each map data, a necessary recording format is then added or revised, and a necessary reading method which is paired with the map data is also added or revised. Thus, when a new API corresponding to a new function is outputted from the navigation system, the corresponding reading method reads out necessary map data, whereby the new function can be realized. Also, even when an old API is outputted from the navigation system only having old functions, it is possible to read out map data corresponding to the old API by the reading method, which is paired with the map data, according to the old API, thereby maintaining the compatibility. Of course, in this way, it is possible to meet the requirements of writing new data into the recording medium as well as reading.

However, there are various hardware (CPU or the like) and operating systems (OS) on the side of the navigation system. In addition, a reading method which is provided together with the map data in pairs relies on the CPU or the OS. Thus, it is generally difficult to unify the reading method so as to be applicable to all the hardware.

On the other hand, it is possible to unify the reading method by using, as a control program for realizing the navigation functions on the navigation system side, a program to be executed on a virtual machine like Java (trademark) which does not rely on specified hardware. However, a current hardware processing speed is accompanied with such a problem that readout access processing time of the map data increases. Especially, display of maps in the navigation system is performed when a driver of vehicle who is a user confirms a map changing its scale in a short time while driving or when a large-scale dedicated guide map of a crossing or a crossroads to be guided is displayed adjusting in a short time to timing of the guidance, and rapid readout is required. Thus, such an increase of map data readout time lowers the userfriendliness of the system.

Therefore, while employing C language or assembly language to constitute the processing program on the side of the navigation system in consideration of the processing speed of hardware, it is sought under the existing circumstances to use Java to constitute the control program on the navigation system side to take advantage of the recent remarkable progress of hardware processing speed. Consequently, it is likely that cases of using C language or assembly language to constitute the control program on the navigation system side and cases of using Java to constitute the program will be intermingled.

This means that program inconsistencies may arise. More specifically, even when a request for map data is issued from the navigation system side (control program for realizing the navigation functions) to a data access section (control program for reading out the map data requested by a map data storage section) to obtain desired map data, the C language constitutes the navigation system side, whereas the Java constitutes the data access section. Of course, it is generally been noted that an exchange of data between the object oriented C language (C++ or the like) and Java is realized by making the data object-oriented. However, a concrete processing method or system to cope with the inconsistency of control programs described above which may arise during the navigation in the case of data to be processed being the map data has not been developed.

SUMMARY OF THE INVENTION

The object of the present invention is to provide an access method and system which can read out requested map data from a recording medium and supply even if C language, which relies on peculiar hardware and CPU, or Java (trademark), which does not rely on the peculiar hardware, constitutes the control program of a navigation function section and Java constitutes the control program of a data access section which reads out and returns map data at the request of the navigation function section.

In order to achieve the object described above, in the present invention which is a map data access method for navigation to read out map data for navigation from a recording medium and output them to a navigation system, the map data is requested by issuing a predetermined API from the navigation system (navigation function section), and the data access section reads out from the recording medium the map data designated by the API and returns them as a byte array object. Transmission and reception of data between object oriented C language (C++ or the like) and Java can be realized by making the data object-oriented. Thus, in the present invention, it is possible to reliably send the map data to the navigation side regardless of whether the C language or the Java constitutes the control program on the navigation system side, by applying the objectification to the map data, reading out from the recording medium the map data as a byte array object and returning them to the navigation system side.

Here, preferably, map data, such as map data for display, map data for position computation, guide map data, and map data for route computation, are requested, and if map data within a specified range are requested, map data in a range covering the specified range will be read out as a byte array object and returned to the navigation system side. Further, if map data are requested designating its range by coordinates, level structure or a data set ID will be read out as a byte array object and returned to the navigation system side.

Further, in order to achieve the object described above, the present invention is composed of execution means (navigation function section) for carrying out navigation functions including display of maps and computation of routes and data access means for reading out data recorded in the recording medium, wherein the execution means makes a request to the data access means for map data by issuing the API, and the data access means reads out the map data from the recording medium by a method corresponding to the API and outputs the map data to the execution means as a byte array object. Even if the C language (C++ or the like) or Java constitutes a control program of the execution means and the Java constitutes a control program of the data access means, the map data can be utilized without being affected by any inconsistencies between the control programs by reading out the map data as a byte array object and returning them to the execution means.

DESCRIPTION OF THE PREFERRED EMBODIMENTS

A preferred embodiment of the present invention will be described in the following with reference to the accompanying drawings.

First Embodiment

Figure 1:
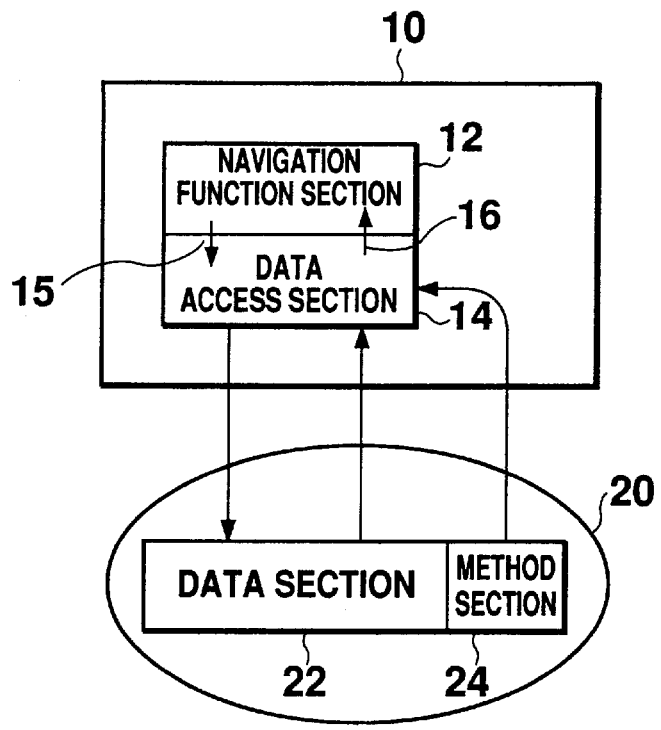
FIG. 1 is a conceptual drawing of a system according to an embodiment of the present invention.

FIG. 1 is a conceptual block diagram of this embodiment. A navigation platform 10 is loaded into a vehicle and displays desired map data on a display, which is not shown in the drawings, at the request of a user, or searches a route to a destination set by the user and displays it. The navigation platform 10 has fundamental functions, such as display of the map data, display of the present location of a vehicle, computation of a route to a destination, and guidance of a route to a destination. In order to realize these functions, the navigation platform 10 has a navigation function section 12, a data access section 14, and an application programming interface (API) used for transmission and reception of data between the navigation function section 12 and the data access section 14.

The navigation function section 12 is a block which performs display of maps, computation of routes, or the like at the request of a user. It makes a request to the data access section 14 for map data necessary for executing these functions by issuing an API 15, and inputs map data 16 from the data access section 14.

The data access section 14 reads out necessary map data from a recording medium 20, such as a CD-ROM and a DVD, at the request of the navigation function section 12 and outputs them to the navigation function section 12. Such readout is performed using a method which is recorded in the recording medium 20 together with map data in pairs. More specifically, when the API 15 according to the request of the user is issued from the navigation function section 12, the data access section 14 reads out the map data by a method corresponding to the API 15 and supplies them to the navigation function section 12.

Incidentally, the navigation platform 10 is specifically composed of a microcomputer.

The recording medium 20 is composed of a CD-ROM or a DVD as described above and has a method section 24, which is paired with the map data, other than a data section 22 (object oriented). In the data section 22, map data for display, map data for route computation, or the like are stored, whereas in the method section 24, a readout method of the data recorded in the data section 22 is stored.

The constitution of this embodiment is as described above, and when the navigation function section 12 makes a request for map data, the data access section 14 reads out the requested map data from the data section 22 of the recording medium 20 and outputs them to the navigation function section 12.

Here, if the C language or the Java constitutes both the control programs of the navigation function section 12 and the data access section 14, there will be no problem. However, it is necessary that the map data can be read out and utilized similarly even though Java is used for describing the control program of the data access section 14 and the C language (C++ or the like) is used for describing the control program of the navigation function section 12. Thus, in the present invention, using the byte array object of a Java native interface, the data access section 14 reads out the map data from the recording medium 20 and outputs them to the navigation function section 12. Here, to be specific, the byte array object means that data are processed with one byte (8 bits) as a unit, and the byte array object can be accessed using a first address and a size from the first address. Also, even if the C language is used for describing the control program of the navigation function section 12 (or the Java is used for describing the control program), the navigation function section 12 can utilize the map data by reading out the map data as such a byte array object.

A specific map data access method will now be described.

First, a process to be carried out when the navigation function section 12 requests the map data for display will be described in this embodiment. When display is requested by a user of the navigation system, the navigation function section 12 instructs the data access section 14 to read out necessary map data for display. In other words, the navigation function section 12 outputs a request for the map data for display to the data access section 14. A form of the request is such that a range of the map data is designated as a rectangular range in latitude and longitude. To be specific, coordinates at the bottom left-hand corner (in latitude and longitude) and at the top right-hand corner (in latitude and longitude) of the rectangular range are designated. A function "GetDispDataSet" is defined as an API function to be used, and a request is made to the data access section 14 using the function "GetDispDataSet (x1, y1, x2, y2, scale)."

Incidentally, x1 and y1 are coordinates in longitude and latitude at the bottom left-hand corner of the rectangular range, and x2 and y2 are coordinates in longitude and latitude at the top right-hand corner of the rectangular range. Latitude and longitude can be expressed, for example, in four bytes, respectively. Further, the scale is a designated value on a reduced scale, and if zero is designated, a previous value on a reduced scale will be used.

After receiving such a request, the data access section 14 reads out from the data section 22 of the recording medium 20 not a rectangular range itself which is designated in latitude and longitude, but a range covering the designated rectangular range, and then returns it to the navigation function section 12 as a byte array object.

Figure 2:
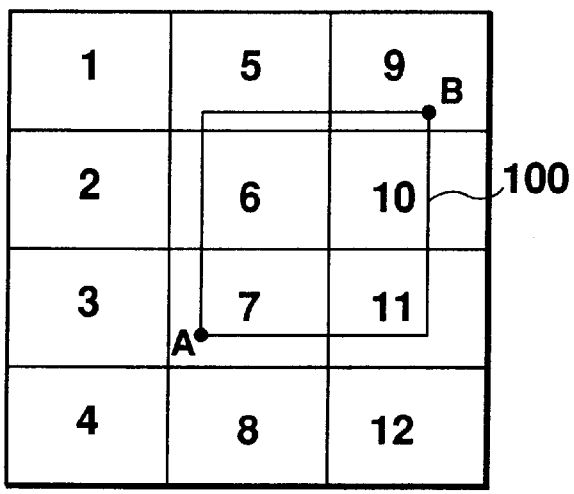
FIG. 2 is an explanatory drawing showing an extent of readout according to an embodiment of the present invention.

FIG. 2 typically shows a range of the map data to be read out by the data access section 14 from the data section 22. In the drawing, the areas 1, 2, . . . are area segments of the map data recorded in the data section 22 of the recording medium 20 and are also segments which rely on a recording format of the recording medium 20. Further, if a point A and a point B are locations which correspond to the latitude and longitude designated by the navigation function section 12, a rectangular range of the map data requested by the navigation function section 12 is a range shown by a numeral reference 100. In the conventional access method, only the map data which exist within a rectangular range requested are read out and outputted. In this embodiment, however, since data are returned as a byte array object, if a designated rectangular range does not coincide with an area segment, map data covering the rectangular range will be read out. The map data covering the rectangular range means a range wider than the rectangular range. To be specific, a range to be read out by the data access section 14 in FIG. 2 covers all the map data in areas 5, 6, 7, 9, 10, and 11. These map data read out are outputted to the navigation function section 12 as a byte array object. The navigation function section 12 supplies these data outputted from the data access section 14 to a display or the like in order for the map data to be displayed. If the designated rectangular range coincides with the area segment, map data in a range equivalent to the rectangular range will be read out and supplied to the navigation function section 12. Examples of output formats are shown in Table 1, Table 2, Table 3 and Table 4.

TABLE 1

| Item number | Offset | Data length | Form of data | Name of item |
|---|---|---|---|---|
| 1 | 0 | B1 | | Display data header |
| 2 | 01 | B2 | | Background data frame |
| 3 | 02 | B3 | | Road data frame |
| 4 | 03 | B4 | | Name data frame |

TABLE 2

| Item number | Offset | Data length | Form of data | Name of item |
|---|---|---|---|---|
| 1 | 0 | 4 | N(unit: 2 bytes) | Data size |
| 2 | 4 | B1 | | Face configuration data frame |
| 3 | 01 | B2 | | Line configuration data frame |

TABLE 3

| Item number | Offset | Data length | Form of data | Name of item |
|---|---|---|---|---|
| 1 | 0 | 4 | N(unit: 2 bytes) | Data size |
| 2 | 4 | 2 | N | Number of classifications of roads (n) |
| 3 | 6 | B1 | | Rows of road classification data lists (#1 to #n) |

TABLE 4

| Item number | Offset | Data length | Form of data | Name of item |
|---|---|---|---|---|
| 1 | 0 | 4 | N(unit: 2 bytes) | Data size |
| 2 | 4 | 2 | N | Number of data (n) |
| 3 | 6 | B1 | | Rows of name data record (#1 to #n) |

Table 1 shows an output format of the display data frame. Table 2 shows an output format of the background data frame. Table 3 shows an output format of the road data frame. Table 4 shows an output format of the name data frame. Further, in each of the output formats, the data length is a unit of two bytes, and the form of data is such that N is an integer and CC is a letter code. These output formats are rows of data in an array which can be accessed in byte units, and the navigation function section 12 receives the data as a byte array object.

In the face configuration data frame and the line configuration data frame shown in Table 2, data size, number of classifications, and rows of classification data lists are included, and in the classification data lists, a number of element points and coordinate values of element points are included. Further, in the road classification data shown in Table 3, a classification code and an attribute code are included. The classification code covers superhighways, municipal expressways, general toll roads, national highways, main highways, or the like. On the other hand, the attribute code covers planned road identification flags, above-ground, tunnels, underground, overhead facilities, bridges, or the like. Further, the name data record shown in Table 4 covers data lists of display angle information and display character information, and the character information data list includes the classification code, a character data size, character strings, or the like.

Second Embodiment

In the first embodiment described above, the case of reading out the map data for display from the navigation function section 12 is described. On the other hand, in this embodiment, a process to be performed when the navigation function section 12 requests the map data for position computation will be described.

When a user of the navigation system requests position computation, the navigation function section 12 outputs a request for map data to be used for the position computation to the data access section 14. The position computation is specifically that after the assessment of a location of vehicle detected by a GPS or the like, superimposed display of the location of vehicle is performed. To designate, for example, coordinates at the bottom left-hand corner (latitude and longitude) and at the top right-hand corner (latitude and longitude) of a rectangular range similarly to the first embodiment is one of the forms of the requests made by the navigation function section 12 to the data access section. Specifically, a function "PositioningDataGet" is defined as an API function, and a request is made to the data access section 14 using the function "PositioningDataGet (x1, y1, x2, y2)." Information of latitude and longitude may be expressed, for example, in each four bytes (32 bits). The first bit may be flagged for identifying the latitude and longitude, the next 20 bits may express the latitude and longitude in units of second, and the remaining one bit may express the latitude and longitude in units of 1/2048 seconds.

The data access section 14 which has received such a request supplies the map data read out by the output formats as shown in Table 5, Table 6, and Table 7 to the navigation function section 12.

TABLE 5

| Item number | Offset | Data length | Form of data | Name of item |
|---|---|---|---|---|
| 1 | 0 | | B1 | Positioning data header |
| 2 | | | B2 | Road data list |

TABLE 6

| Item number | Offset | Data length | Form of data | Name of item |
|---|---|---|---|---|
| 1 | 0 | 4 | N(unit: 2 bytes) | Header size |
| 2 | 4 | 4 | LOC | The top latitude of range of storage |
| 3 | 8 | 4 | LOC | The bottom latitude of range of storage |
| 4 | 12 | 4 | LOC | The left longitude of range of storage |
| 5 | 16 | 4 | LOC | The right longitude of range of storage |
| 6 | 20 | 2 | N | Actual distance in a latitudinal direction of range of storage (unit: m) |
| 7 | 22 | 2 | N | Actual distance in a longitudinal direction of range of storage (unit: m) |
| 8 | 24 | 2 | N | Total number of crossings |
| 9 | 26 | 2 | N | Number of positioning class control data (n) |
| 10 | 28 | | B1 | Row of positioning class control data (#1 to #n) |

TABLE 7

| Item number | Offset | Data length | Form of data | Name of item |
|---|---|---|---|---|
| 1 | 0 | | B1 | Row of positioning class unit road data (#1 to #n) |

Incidentally, Table 5 shows a positioning data frame, Table 6 a positioning data header in Table 5, and Table 7 a road data list in Table 5, respectively. Further, the positioning class unit road data include rows of link string data records, and the link string data records include link string attribute information, link string shape information, or the like. The link string attribute information means a classification of the link string or the number of links within the link string, and the classification of the link string covers, for example, superhighways, municipal expressways, general toll roads, national highways, main highways, general roads, or the like.

Third Embodiment

In this embodiment, a process to be performed when the navigation function section 12 requests the map data for route computation will be described.

When a user of the navigation system requests a search of a route to destination, the navigation function section 12 outputs to the data access section 14 a request for the map data for route computation to be used for a route search. To designate, for example, coordinates of necessary map data for route computation in latitude and longitude is one of the forms of the requests made by the navigation function section 12 to the data access section 14. To be specific, a function "CheckRoutePlanningData" is defined as an API function, and a request is made to the data access section 14 using the function "CheckRoutePlanningData (x, y)." Incidentally, x and y are latitude and longitude.

The data access section 14 which has received such a request reads out a level structure which is preliminary information for obtaining route computation data of the designated coordinates, a classification of roads composed, a classification of roads set at each level, latitude and longitude for designating area at each level, a route computation data set ID, or the like, and supplies them to the navigation function section 12. In Table 8, an output format is exemplified.

TABLE 8

| Item number | Offset | Data length | Form of data | Name of item |
|---|---|---|---|---|
| 1 | 0 | 2 | N | Number of route computation data levels |
| 2 | 2 | 2 | N | Number of classifications of roads (rk) |
| 3 | 4 | 2 | N | Number of regions |
| 4 | 6 | | B1 | Rows of road classification codes (#1 to #rk) |
| 5 | 01 | | B2 | Rows of classifications of road set at each level |
| 6 | 02 | | B3 | Rows of region sizes at each level |
| 7 | 03 | | B4 | Rows of route computation data information |

Incidentally, the number of levels means the number of levels in hierarchical structure of maps, and the number of regions means the number of boundaries of maps. Further, to be specific, the size of a region at each level is outputted by coordinates in longitude and latitude at the bottom left-hand corner and at the top right-hand corner of the region. The route computation data information includes a route computation data level and a route computation data set ID.

Fourth Embodiment

In this embodiment, a case which the navigation function section 12 requests the map data for route computation, similarly to the third embodiment, will be requested. However, unlike the third embodiment, in this embodiment, to designate by latitude and longitude the route computation start coordinates and route computation finish coordinates of necessary map data for route computation is one of the forms of the requests for the map data for route computation made by the navigation function section 12. To be specific, a function "GetRouteDataSetID" is defined as an API function, and a request is made to the data access section 14 using the function "GetRouteDataSetID (x1, y1, x2, y2)". Incidentally, the x1 and x2 are coordinates in latitude and longitude on the start side, whereas the x2 and y2 are coordinates in latitude and longitude on the finish side.

The data access section 14 which has received such a request reads out the route computation data information (level structure, data set ID, or the like) necessary for route computation from the designated start coordinates and finish coordinates and supplies them to the navigation function section 12. In Table 9, an output format is exemplified.

TABLE 9

| Item number | Offset | Data length | Form of data | Name of item |
|---|---|---|---|---|
| 1 | 0 | 2 | N | Number of regions |
| 2 | 2 | B1 | | Rows of route computation data information |

Incidentally, the route computation data information includes a route computation data level and a route computation data set ID.

Fifth Embodiment

In this embodiment, a case will be described in which the navigation function section 12 actually requests the level structure and the data set ID, which are obtained in the fourth embodiment (or the third embodiment), designating them as the map data for route computation. A function "GetRoutePlanningDataID" is defined as an API function, and a request is made to the data access section 14 using the function "GetRoutePlanningDataID level DatasetID)". Incidentally, the level and the DatasetID are the level structure and the data set ID obtained in the fourth embodiment (or the third embodiment), respectively.

The data access section 14 which has received such a request reads out the corresponding map data for route computation and supplies them to the navigation function section 12. In Table 10, output format is exemplified.

TABLE 10

| Item number | Offset | Data length | Form of data | Name of item |
|---|---|---|---|---|
| 1 | 0 | B1 | | Route computation data header |
| 2 | 01 | B2 | | Link data frame |
| 3 | 02 | B3 | | Node data frame |
| 4 | 03 | B4 | | Connection link information data frame |
| 5 | 04 | B5 | | Link form data frame |
| 6 | 05 | B6 | | Road reference data frame |
| 7 | 06 | B7 | | Traffic code data frame |
| 8 | 07 | B8 | | Upper link correspondence data frame |
| 9 | 08 | B9 | | Upper node correspondence data frame |

Incidentally, the route computation data header includes a route computation level, the number of links of the route computation data, the number of nodes of the route computation data, the number of integrated nodes of the route computation data, offsets of connection link information data frame, offsets of link configuration data frame, or the like.

Sixth Embodiment

In this embodiment, a process to be performed when the navigation function section 12 requests guide map data designating a necessary rectangular range of the guide map data by latitude and longitude will be described.

A function "GetGuidePointData" is defined as an API function to be used for requesting the guide map data, and a request for a necessary rectangular range is made to the data access section 14 using the function "GetGuidePointData (TargetNode, areax1, areay1, areax2, areay2)." Incidentally, TargetNode is a node (a fork of intersection or the like) number of a guide point, areax1 is a longitude coordinate at the top left-hand corner of the rectangular range, areay1 is a latitude coordinate at the top left-hand corner of the rectangular range, areax2 is a longitude coordinate at the bottom right-hand corner of the rectangular range, and areay2 is a latitude coordinate at the bottom right-hand corner of the rectangular range.

The data access section 14 which has received such a request reads out guidance data within a range covering the rectangular range designated and supplies them to the navigation function section 12 same as FIG. 2. The guidance data are, for example, names of intersections, names of admission passages, names of escape roads, or the like. Table 11 exemplifies an output format.

TABLE 11

| Item number | Offset | Data length | Form of data | Name of item |
|---|---|---|---|---|
| 1 | 0 | B1 | | Route guide data header |
| 2 | 01 | B2 | | Intersection name data record |
| 3 | 02 | B3 | | Direction name data record |
| 4 | 03 | B4 | | Admission passage name data record |
| 5 | 04 | B5 | | Escape road name data record |
| 6 | 05 | B6 | | Pattern data record |
| 7 | 06 | B7 | | Configuration data frame |
| 8 | 07 | B8 | | Landmark data frame |

Incidentally, the route guide data header includes node numbers, x-coordinate and y-coordinate of the node to which attention is paid, guidance classification codes, admission passage classification codes, escape road classification codes, admission route codes, escape route codes, offsets of intersection name data record, or the like. Further, the guidance classification codes include intersections, junctures, forks, exits of tunnels, entrances of tunnels, exits of superhighways, interchanges, service areas, or the like.

Seventh Embodiment

In this embodiment, a process to be performed when the navigation function section 12 requests a road link ID, a direction of the road link, a distance from an endpoint of the road link, and a compass direction designating them as the guide map data will now be described.

A function "GetGuidePointDistance" is defined as an API function to be used for requesting the guide map data, and a request is made to the data access section 14 using the function "GetGuidePointDistance (linkID, linkDir, fromlinkTerm, dir)". Incidentally, linkID is a link ID, linkdir is a direction of the link, fromlinkTerm is a distance from the endpoint of the link, and dir is a compass direction (covering from 0 to 360 degrees in a clockwise direction letting due north be 0 degrees).

The data access section 14 which has received such a request reads out from the recording medium 20 data about a distance from a designated location to a location which requires guidance, a node number of a guiding point, coordinates of the guiding point in latitude and longitude, and a classification of the admission passage, and supplies them to the navigation function section 12.

Eighth Embodiment

In this embodiment, a process to be performed when the navigation function section 12 requests a road link ID array designating it as the guide map data will be described.

A function "GetGuidePointList" is defined as an API function to be used for requesting the guide map data, and a request is made to the data access section 14 using the function "GetGuidePointList LinkIDarray)." Incidentally, LinkIDarray is a road link ID array.

The data access section 14 which has received such a request reads out guiding point data in a designated road link array from the recording medium 20, and supplies them to the navigation function section 12. Table 12 exemplifies an output format of the guidance node data.

TABLE 12

| Item number | Offset | Data length | Form of data | Name of item |
|---|---|---|---|---|
| 1 | 0 | 8 | N | Node number (link ID to link ID) |
| 2 | 8 | 4 | LOC | x-coordinate of node |
| 3 | 12 | 4 | LOC | y-coordinate of node |
| 4 | 16 | 2 | N | Admission passage classification code |
| 5 | 18 | 2 | N | Escape road classification code |
| 6 | 20 | 2 | N | Guidance classification code |
| 7 | 22 | 4 | N | Route number |
| 8 | 25 | 4 | D | Offset of intersection name data record |
| 9 | 30 | 4 | D | Offset of admission passage name data record |
| 10 | 34 | 4 | D | Offset of escape passage name data record |
| 11 | 38 | 4 | N | Block distance up to next quidance node |

Incidentally, Table 12 shows an output format of the guidance node data record. To be specific, the guiding point data include the guidance node data size (overall data frame), the number of the data, or the like. Further, the intersection name data record includes a name character string data size, a voice file name size, or the like.

Ninth Embodiment

In this embodiment, a process to be performed when the navigation function section 12 requests a road link ID array and a map scale reduction code designating them as the highlighting guide map data will be described.

A function "GetguideFormList" is defined as an API function to be used for requesting the guide map data, and a request is made to the data access section 14 using the function "GetGuideFormList (LinkIDarray, longscale)." Incidentally, LinkIDarray is a link ID array, and longscale is a reduced scale value.

The data access section 14 which has received such a request reads out from the recording medium 20 configuration data which highlights the designated road link ID array, and supplies them to the navigation function section 12. Table 13 exemplifies an output format of the configuration data.

TABLE 13

| Item number | Offset | Data length | Form of data | Name of item |
|---|---|---|---|---|
| 1 | 8 | B1 | | Route configuration data header |
| 2 | 01 | B2 | | Guidance node data frame |
| 3 | 01 | B3 | | Line configuration data frame |

Incidentally, the guidance node data include node numbers, admission passage classification codes, escape road classification codes, route numbers, or the like. The line configuration data frame includes data size, classification data, or the like.

Tenth Embodiment

In this embodiment, a process to be performed when the navigation function section 12 requests the map data for retrieval of locations will be described.

A function "GetInitKeyList" is defined as an API function to be used for requesting the map data for retrieval of locations, and a request is made to the data access section 14 using the function "GetInitKeyList ( )." Incidentally, an argument of this function is not used.

The data access section 14 which has received such a request reads out from the recording medium 20 candidate character data for displaying on a display keys to retrieve the Japanese syllabary or to input alphabetic characters, and supplies them to the navigation function section 12. Table 14 exemplifies an output format.

TABLE 14

| Item number | Offset | Data length | Form of data | Name of item |
|---|---|---|---|---|
| 1 | 0 | 2 | N | Number of characters proposed to be inputted (n) |
| 2 | 2 | 2 | N | Number of vertical arrangements of switches |
| 3 | 2 | 2*n | N | Number of horizontal arrangements of switches |
| 4 | 2 | 2*n | C | Characters proposed to be inputted (#1 to #n) |

Eleventh Embodiment

In this embodiment, a process to be performed when the navigation function section 12 requests a string of characters to be inputted, such as the Japanese syllabary or alphabetic characters obtained in the tenth embodiment designating them as the map data for retrieval of locations will be described.

A function "GetNextKeyList" is defined as an API function to be used for requesting the map data for retrieval of locations, and a request is made to the data access section 14 using the function "GetNextKeyList (Inputdata)." Incidentally, Inputdata means a string of characters to be inputted, such as, the Japanese syllabary or alphabetic characters and also a string of characters designated by a user.

The data access section 14 which has received such a request reads out from the recording medium 20 next retrieval character candidate string data of the designated string of characters to be inputted, and supplies them to the navigation function section 12. Table 15 exemplifies an output format.

TABLE 15

| Item number | Offset | Data length | Form of data | Name of item |
|---|---|---|---|---|
| 1 | 0 | 4 | N | Number of characters left for retrieval |
| 2 | 4 | 4 | N | Corresponding data record number |
| 3 | 10 | 2 | N | Number of characters proposed to be inputted (n) |
| 4 | 12 | 2*n | C | Characters proposed to be inputted (#1 to #n) |

Twelfth Embodiment

In this embodiment, a process to be performed when the navigation function section 12 requests a string of characters to be inputted, such as the Japanese syllabary or alphabetic characters designating them as the map data for retrieval of locations will be described.

A function "GetListData" is defined as an API function to be used for requesting the map data for retrieval of locations, and a request is made to the data access section 14 using the function "GetListData (Inputdata)." Incidentally, Inputdata means a string of characters to be inputted, such as the Japanese syllabary or alphabetic characters.

The data access section 14 which has received such a request reads out from the recording medium 20 location name list display data corresponding to the designated string of characters to be inputted, and supplies them to the navigation function section 12. Table 16 exemplifies an output format.

TABLE 16

| Item number | Offset | Data length | Form of data | Name of item |
|---|---|---|---|---|
| 1 | 0 | 2 | N | Number of corresponding data |
| 2 | 2 | | S | Details of corresponding data (#1 to #n) |

Incidentally, the details of corresponding data include location information IDs, data sizes of the location information IDs, names of the location information, the Japanese syllabary to be added for showing the reading of the location information names, classifications, prefectural codes, or the like.

Thirteenth Embodiment

In this embodiment, a process to be performed when the navigation function section 12 requests a telephone number and the number of its digits to be inputted designating them as the map data for retrieval of locations will be described.

A function "GetPOITelNo" is defined as an API function to be used for requesting the map data for retrieval of locations, and a request is made to the data access section 14 using the function "GetPOITelNo (no, Inputnum)." Incidentally, no is a telephone number, and Inputnum is the number of digits to be inputted.

The data access section 14 which has received such a request reads out from the recording medium 20 display data and guide data of a location corresponding to the designated telephone number and the number of digits to be inputted, and supplies them to the navigation function section 12. Table 17 exemplifies an output format.

TABLE 17

| Item number | Offset | Data length | Form of data | Name of item |
|---|---|---|---|---|
| 1 | 0 | 2 | N | Number of location data (n) |
| 2 | 4 | 4*n | D | Location data offset (#1 to #n) |
| 5 | 01 | | B1 | Location data information data frame (#1 to #n) |

Incidentally, the location data information data frame includes rows of location information recording sections, and to be specific, the location information recording sections include x-coordinate and y-coordinate of a location to be displayed, a scale of map to be displayed, latitude and longitude of a representative guiding location, an ID number of the representative guiding location link, a direction of the representative guiding location link, a telephone number, a zip code, or the like.

Fourteenth Embodiment

In this embodiment, a process to be performed when the navigation function section 12 requests a zip code and the number of its digits to be inputted designating them as the map data for retrieval of locations will be described.

A function "GetPOIZipcode" is defined as an API function to be used for requesting the map data for retrieval of locations, and a request is made to the data access section 14 using the function "GetPOIZipcode (zipcode, num)." Incidentally, zipcode is a zip code, and num is the number of digits to be inputted.

The data access section 14 which has received such a request reads out from the recording medium 20 display data and guide data of a location corresponding to the designated zip code and the number of digits to be inputted, and supplies them to the navigation function section 12. The output format is same as that of Table 17.

Fifteenth Embodiment

In this embodiment, a process to be performed when the navigation function section 12 requests the map data for retrieval of locations designating a rectangular range of the map data for retrieval of locations by latitude and longitude will be described.

A function "GetListDataArea" is defined as an API function to be used for the map data for retrieval of locations, and a request is made to the data access section 14 using the function "GetListDataArea (x1, y1, x2, y2)." Incidentally, the x1 and the y1 are longitude and latitude at the bottom left-hand corner of the rectangular range, and the x2 and the y2 are longitude and latitude at the top right-hand corner of the rectangular range.

The data access section 14 which has received such a request reads out from the recording medium 20 location name list display data (list ID) within the designated rectangular range, and supplies them to the navigation function section 12.

Sixteenth Embodiment

In this embodiment, a process to be performed when the navigation function section 12 requests a location list ID designating it as the map data for retrieval of locations will be described.

A function "GetListSearchData" is defined as an API function to be used for requesting the map data for retrieval of locations, and a request is made to the data access section 14 using the function "GetListSearchData (listID)." Incidentally, the listID is the list ID obtained in the fifteenth embodiment.

The data access section 14 which has received such a request reads out from the recording medium 20 list retrieval data corresponding to the designated list ID, and supplies them to the navigation function section 12. Table 18 exemplifies an output format.

TABLE 18

| Item number | Offset | Data length | Form of data | Name of item |
|---|---|---|---|---|
| 1 | 0 | 4 | N | Number of characters proposed to be inputted (n) |
| 2 | 4 | 4 | N | Previous list retrieval ID |
| 3 | 8 | 2 | N | Size of data record proposed to be inputted |
| 4 | 10 | 48*n | | Data proposed to be inputted (#1 to #n) |

Incidentally, the data proposed to be inputted include characters of the name proposed to be inputted, the Japanese syllabary proposed to be inputted, an ID proposed to be inputted next, or the like.

Seventeenth Embodiment

In this embodiment, a process to be performed when the navigation function section 12 requests a range of retrieval based on position coordinates in latitude and longitude and a distance from the position coordinates designating the range as the map data for retrieval of locations will be described.

A function "GetAddressList" is defined as an API function to be used for requesting the map data for retrieval of locations, and a request is made to the data access section 14 using the function "GetAddressList (x, y, width)." Incidentally, x and y are longitude coordinate and latitude coordinate, respectively, and width is a range of retrieval.

The data access section 14 which has received such a request reads out from the recording medium 20 address list data within a range corresponding to the designated position and range of retrieval, and supplies them to the navigation function section 12. Table 19 exemplifies an output format.

TABLE 19

| Item number | Offset | Data length | Form of data | Name of item |
|---|---|---|---|---|
| 1 | 0 | 4 | N | Number of peripheral candidate addresses (n) |
| 2 | 4 | 2 | N | Candidate address data record size (s) |
| 3 | 6 | s*n | | Candidate address data (#1 to #n) |

Incidentally, the candidate address data include latitude and longitude, prefectural codes, administrative district (cities, towns, and villages) codes, avenue or street numbers, house numbers, or the like.

Eighteenth Embodiment

In this embodiment, a process to be performed when the navigation function section 12 requests position coordinates in latitude and longitude designating them as the map data for retrieval of locations will be described.

A function "GetAddress" is defined as an API function to be used for requesting the map data for retrieval of locations, and a request is made to the data access section 14 using the function "GetAddress (x, y)." Incidentally, x and y are a longitude coordinate and a latitude coordinate.

The data access section 14 which has received such a request reads out address data of the designated location from the recording medium 20, and supplies them to the navigation function section 12. Table 20 exemplifies an output format.

TABLE 20

| Item number | Offset | Data length | Form of data | Name of item |
|---|---|---|---|---|
| 1 | 8 | 1 | N | Prefectural code |
| 2 | 9 | 2 | N | Administrative district (cities, towns, villages) code |
| 3 | 11 | 4 | N | Village section code |
| 4 | 15 | 1 | N | Avenue or street number |
| 5 | 16 | 1 | N | House number |
| 6 | 17 | 2 | N | House number |

Nineteenth Embodiment

In this embodiment, a process to be performed when the navigation function section 12 designates an address hierarchy code and an address code as the map data for retrieval of locations will be described.

A function "GetAddressName" is defined as an API function to be used for requesting the map data for retrieval of locations, and a request is made to the data access section 14 using the function "GetAddressName (addressid, addresscode)." Incidentally, addressid is the address hierarchy code, and for example, numeral 1 represents urban and rural prefectures and numeral 2 represents cities, towns, villages, and the like. Further, addresscode is the address code.

The data access section 14 which has received such a request reads out from the recording medium 20 address character string data corresponding to the designated address hierarchy and address, and supplies them to the navigation function section 12. Table 21 exemplifies an output format.

TABLE 21

| Item number | Offset | Data length | Form of data | Name of item |
|---|---|---|---|---|
| 1 | 0 | 2 | N | Code number |
| 2 | 2 | 12 | CC | Character string |
| 3 | 14 | 12 | CC | Japanese syllabary |

As described above, in the present invention, map data are read out from a recording medium and outputted as a byte array object. Thus, the map data read out can be utilized similarly whether a program language (C language or assembly language) which relies on a particular hardware structure is used or a program language (Java or the like) which does not rely on a particular hardware structure is used for the description of the navigation system (navigation function section). Therefore, it is possible to maintain compatibility.

What is claimed is:

1. A map data access method for navigation which reads out map data for navigation from a recording medium and outputs them to a navigation system, said method comprising the steps of:

(a) requesting map data by outputting a predetermined application programming interface from said navigation system; and (b) reading out from said recording medium map data designated by said application programming interface and returning the map data as a byte array object to said navigation system.

2. The method according to claim 1, wherein map data for display are requested at said step (a), and map data in a range covering a requested range are read out from said recording medium and returned to said navigation system at said step (b).

3. The method according to claim 1, wherein map data for position computation are requested at said step (a), and map data in a range covering a requested range are read out from said recording medium and returned to said navigation system at said step (b).

4. The method according to claim 1, wherein guide map data are requested at said step (a), and map data in a range covering a requested range are read out from said recording medium and returned to said navigation system at said step (b).

5. The method according to claim 1, wherein coordinates of map data for route computation are requested at said step (a), and at least any one of level structure, a classification of roads composed, coordinates in latitude and longitude, and a data set ID of the map data for route computation in said coordinates requested is read out from said recording medium and returned to said navigation system at said step (b).

6. The method according to claim 1, wherein a route computation start coordinate and a route computation finish coordinate of the map data for route computation are requested at said step (a), and at least one of level structure and a data set ID of map data for route computation between said start coordinate and said finish coordinate requested is read out from said recording medium and returned to said navigation system at said step (b).

7. The method according to claim 1, wherein level structure and a data set ID of the map data for route computation are requested at said step (a), and map data corresponding to said level structure and said data set ID requested are read out from said recording medium and returned to said navigation system at said step (b).

8. A navigation system comprising:

execution means for executing navigation functions including display of maps or computation of routes; and data access means for reading out data recorded in a recording medium, wherein said execution means make a request to said data access means for map data by outputting an application programming interface, and said data access means reads out map data from said recording medium in a manner corresponding to said application programming interface and outputs the map data as a byte array object to said execution means.

9. The system according to claim 8, wherein said execution means make a request to said data access means for map data for display, and said data access means reads out from said recording medium map data in a range covering a requested range and outputs the map data to said execution means.

10. The system according to claim 8, wherein said execution means make a request to said data access means for map data for position computation, and said data access means reads out from said recording medium map data in a range covering a requested range and outputs the map data to said execution means.

11. The system according to claim 8, wherein said execution means make a request to said data access means for guide map data, and said data access means reads out from said recording medium map data in a range covering a requested range and outputs the map data to said execution means.

12. The system according to claim 8, wherein said execution means make a request to said data access means for coordinates of map data for route computation, and said data access means reads out from said recording medium at least any one of level structure, a classification of roads composed, coordinates in latitude and longitude, and a data set ID of the map data for route computation in said coordinates requested and outputs it to said execution means.

13. The system according to claim 8, wherein said execution means makes a request to said data access means for a route computation start coordinate and a route computation finish coordinate of the map data for route computation, and said data access means reads out from said recording medium at least any one of level structure and a data set ID of map data for route computation between said start coordinate and said finish coordinate requested and outputs it to said execution means.

14. The system according to claim 8, wherein said execution means make a request to said data access means for level structure and a data set ID of the map data for route computation, and said data access means reads out from said recording medium map data corresponding to said level structure and said data set ID requested and outputs the map data to said execution means.

* * * * *